UNITED STATES PATENT OFFICE.

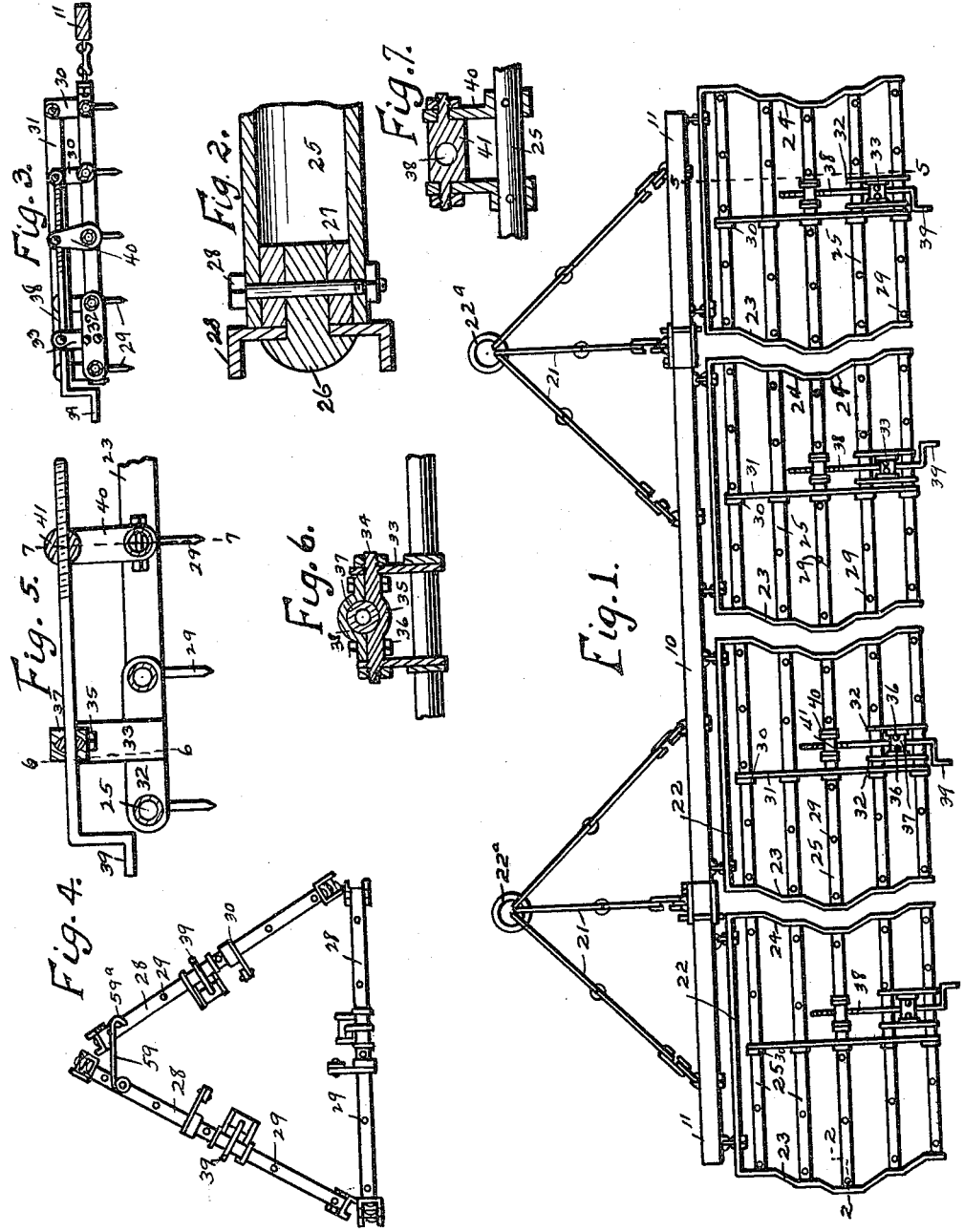

ALFRED A. NELSON AND WALTER NELSON, OF ATLANTIC, IOWA.

HARROW.

1,148,790. Specification of Letters Patent. Patented Aug. 3, 1915.

Application filed June 12, 1914. Serial No. 844,808.

*To all whom it may concern:*

Be it known that we, ALFRED A. NELSON and WALTER NELSON, citizens of the United States, and residents of Atlantic, in the county of Cass and State of Iowa, have invented a certain new and useful Harrow, of which the following is a specification.

The object of our invention is to provide a harrow composed of a plurality of sections, and of comparatively simple, durable and inexpensive construction, including a draw bar so built and arranged that the outer harrow sections may be tilted upwardly and toward each other for reducing the total length of the harrow for drawing it through gates, over narrow roads and the like.

Still a further object is to provide in such a harrow simple and effective means for tilting the bars which carry the teeth for varying the angle of the teeth with relation to the ground, said means being arranged to permit the tilting of the harrows and to be out of the way of the tongue which draws the cart.

Our invention consists in certain details, in the construction, combination and arrangement of the various parts of the device, whereby the objects contemplated are attained, as hereinafter more fully set forth, pointed out in our claims, and illustrated in the accompanying drawings, in which:

Figure 1 shows a top or plan view of a harrow, embodying our invention, and having four sections. Fig. 2 shows a detail, sectional view, taken on the line 2—2 of Fig. 1. Fig. 3 shows a detail, sectional view, taken on the line 5—5 of Fig. 1. Fig. 4 shows a rear elevation of a three section harrow, embodying our invention, showing the outside sections in their raised or folded positions. Fig. 5 shows a detail, sectional view, taken on the line 5—5 of Fig. 1. Fig. 6 shows a detail, sectional view, taken on the line 6—6 of Fig. 5. Fig. 7 shows a detail, sectional view, taken on the line 7—7 of Fig. 5.

In the accompanying drawings, we have used the reference numeral 10 to indicate generally the central member of our improved folding draw bar which has the folding or collapsible members 11.

Where several harrow sections are used, jointed rods 21 are secured to the members of the draw bar and are extended forwardly on converging lines and pivoted to the ring 22ª. In four section harrows two sets of said jointed rods are employed, as shown in Fig. 1. Each section of the harrow comprises an outer frame having the forward transverse member 22 and the side members 23 and 24. The frame is composed of an outwardly opening channel bar. Mounted between the side members 23 and 24 of each section are a plurality of cross bars 25, preferably made of pipe.

The members 25 are secured to the side frame members in the following way: A headed bolt 26 is extended through the side members from the outer surface thereof, as shown in Fig. 2. The end of the bolt is received within the end of the member 25. Mounted on the bolt 26, within the member 25, is a collar 27 which serves as a filler. The bolt 28 extends through the end walls of the member 25 and through the collar 27 and the bolt 26, as shown in Fig. 2. It will readily be seen that the bolt 26 and member 25 may rotate with relation to the side members of the frame.

Mounted in the transverse frame members 25 are a plurality of downwardly extending harrow teeth 29. For rotating the various cross members 25 and thereby tilting the teeth 29 to any desired angle, some means other than the levers commonly used are necessary in our harrow for the reason that the ordinary levers would be in the way when the outer sections are tilted upwardly. For rotating the member 25 and tilting the harrow teeth, the following means have therefore been provided. Secured to each member 25 is an upwardly extending arm 30. The arms 30 are arranged in a series on each harrow section in a line parallel with the fore and aft longitudinal axis of the section. Pivoted to the upper ends of the members 30 of each section is a bar 31, whereby the rotary movement of any one member 25 is imparted to all the other members 25 of each harrow section. Mounted on two adjacent members 25 of each section is a pair of parallel plates 32, in which the members 25 may rotate. Secured to each of the members 32 of each pair and extending upwardly therefrom is a bracket arm 33. Pivotally mounted in the upper ends of the arms 33 is a cross member 34, the central portion of which forms a half of the bearing 35. Secured to the member 34 between the upright members 33 by means of bolts 36, is a bearing member 37. Rotatably but non-slidably mounted in the bearing members 35 and 37 is a rod 38, having on one end a crank handle 39. Mounted on one of the members 25, near those on which the members 32 are mounted, is a pair of upwardly extending, parallel arms 40. Rotatably mounted in the upper ends of the arms 40 is a block 41, having a screw-threaded opening in which is received one end of the rod 38 which is also screw-threaded. It will be seen that by rotating the rod 38, the upright members 40 may be tilted in either direction, and on account of the members 30 and 31, all of the members 25 will be tilted one way or the other for determining the position of the teeth 29.

The advantage of the tilting device just shown is found partially in its compactness and in its arrangement whereby it will not interfere with the folding of the upper harrow sections upwardly and inwardly to their positions, as shown in Fig. 4. The harrow sections are placed side by side in succession, as shown in Fig. 1, and are pivotally secured to the draw bar sections. The central draw bar member 10 may be made of such size that either one or two sections may be secured thereto.

In the practical operation of our improved harrow, the members are assembled in the positions heretofore described. By rotating the rods 38 by means of the crank handles 39, the harrow teeth 29 may be tilted to any desired position. It will be seen that the rotation of the rod 38 draws the upper end of the members 40 rearwardly or moves them forwardly, as the case may be, thereby rotating the member 25 on which said members 40 are secured, and tilting the teeth 29 in such member 25. All of the members 25 being connected together by means of the members 30 and 31, it will be seen that the teeth may be set at any desired angle. When it is desired to drive the harrow in a comparatively narrow path, as through a gate or the like, the outer member 11 may be tilted upwardly and inwardly and will carry with it the harrow section secured to it. The members 11 may be tilted upwardly on each side and may be rested against each other on their upper ends, and if desired, may be secured together by suitable means. A hook 59 may be secured to some of the members 25 if desired to engage suitable devices 59ª on other members 25. The side edges of the outer harrow sections preferably rest on the side edges of the middle members, as shown in Fig. 4, when the harrow is in its collapsed position. When four sections are used, the two outer sections rest on top of the two inner sections when the harrow is collapsed.

The advantages of a harrow of the type heretofore described are largely obvious from the description of its operation. The outer harrow sections may be tilted upwardly and supported in their upwardly tilted positions, or placed upon the inner sections, where four sections are used so that the harrow may be dragged through a gate or over a comparatively narrow road. The collapsing, as described, would be impossible if the ordinary tilting levers were used, and for these reasons a special means for tilting the teeth has been provided, as heretofore set forth. The draw bar is made in sections which are secured together by suitable means.

It will be understood that some changes may be made in the details of the construction of our harrow without departing from its essential features, and it is our intent to cover by this application any such changes which may be included within the scope of the following claims.

We claim as our invention:

1. In a device of the class described, a harrow section comprising a frame having a front member, side members, transverse members rotatably mounted on said side members, teeth mounted in said transverse members, and means for rotating said transverse members for varying the angle of said teeth with relation to the ground, said means comprising upright members secured to said transverse members, a longitudinally arranged bar pivoted to the upper ends of said upright members, a block mounted on two of said transverse members and capable of rotating with relation thereto, a rod rotatably but nonslidably mounted in said block, a second block mounted on another of said transverse members, and capable of rotation with relation thereto, said last named block having a screw threaded opening, said rod having a screw threaded end received in said screw threaded opening.

2. In a device of the class described, a harrow section, comprising a frame including side members, transverse members rotatably mounted with relation to said side members, means for operatively connecting said transverse members together so that the rotation of one transverse member causes the rotation of all the other transverse members of said section, longitudinally arranged members mounted on two adjacent, transverse members, upright members mounted on said longitudinal members, a block pivotally mounted between said upright members, a rod rotatably but non-slidably mounted in the said block, having a screw threaded end, upright members on another of said transverse members, a block pivotally mounted between said last named upright members, having a screw threaded opening in which the screw threaded end of said rod is received.

3. In a device of the class described, a harrow, comprising a frame including side members, transverse members rotatably mounted with relation to said side members, means for operatively connecting said transverse members together so that the rotation of one transverse member causes the rotation of all the other transverse members of said section, longitudinally arranged members mounted on two adjacent, transverse members, upright members mounted on said longitudinal members, a block pivotally mounted between said upright members, a rod rotatably but non-slidably mounted in said block, having a screw threaded end, upright members on another of said transverse members, a block pivotally mounted between said last named upright members having a screw threaded opening in which the screw threaded end of said rod is received.

Des Moines, Iowa, May 30, 1914.

ALFRED A. NELSON.
WALTER NELSON.

Witnesses:
RALPH JECKL,
G. H. FREEMAN.

Copies of this patent may be obtained for five cents each, by addressing the "Commissioner of Patents, Washington, D. C."